United States Patent [19]
Matsumoto et al.

[11] Patent Number: 4,927,799
[45] Date of Patent: May 22, 1990

[54] CATALYST FOR THE PURIFICATION OF EXHAUST GAS

[75] Inventors: Shinichi Matsumoto, Aichi; Naoto Miyoshi; Mareo Kimura, both of Nagoya; Masakuni Ozawa, Kasugai; Akio Isogai, Nagoya, all of Japan

[73] Assignees: Toyota Jidosha Kabushiki Kaisha; Kabushiki Kaisha Toyota Chuo Kenkyusho, both of Aichi, Japan

[21] Appl. No.: 290,421

[22] Filed: Dec. 27, 1988

Related U.S. Application Data

[63] Continuation of Ser. No. 111,661, Oct. 23, 1987, abandoned.

[30] Foreign Application Priority Data

Apr. 11, 1986 [JP] Japan .................................. 61-262521
Apr. 11, 1986 [JP] Japan .................................. 61-262522

[51] Int. Cl.$^5$ ..................... B01J 21/06; B01J 23/10; B01J 23/40; B01J 23/74
[52] U.S. Cl. ................................. 502/303; 502/304; 423/213.5
[58] Field of Search .......................... 502/303, 304; 423/213.5

[56] References Cited

U.S. PATENT DOCUMENTS

| 4,587,231 | 5/1986 | Sawamura et al. | 502/304 |
| 4,624,940 | 11/1986 | Wan et al. | 502/303 X |
| 4,702,897 | 10/1987 | Onal | 423/213.5 |

FOREIGN PATENT DOCUMENTS 61-57347 7/1986 Japan ................................ 423/213.5

Primary Examiner—W. J. Shine
Attorney, Agent, or Firm—Finnegan, Henderson, Farabow, Garrett, Dunner

[57] ABSTRACT

A catalyst for the purification of exhaust gases comprising a catalyst carrier layer and catalyst ingredients carried thereon, is capable of enhancing the purification property by suppressing the growth of cerium oxide particles and preventing the formation of LaAlO$_3$. This catalyst has two composition types. One is a binary composition catalyst comprising oxides of cerium and zirconium in the catalyst carrier layer and the other is a ternary composition catalyst comprising oxides of cerium, zirconium and lanthanum in the catalyst carrier layer.

20 Claims, 1 Drawing Sheet

CATALYST FOR THE PURIFICATION OF EXHAUST GAS

This is a continuation, of application Ser. No. 111,661, filed 10/23/87, now abandoned.

BACKGROUND OF THE INVENTION

1. Field of the Invention

This invention relates to a catalyst for the purification of exhaust gas capable of purifying exhaust gases from internal combustion engines, particularly, from atuomotive engines and of removing carbon monoxide (CO), hydrocarbon (HC) and nitrogen oxides (NOx) existed in the exhaust gases.

2. Prior Art

A conventional catalyst for purifying automobile exhaust gases usually comprises a catalyst carrier layer and catalyst ingredients carried thereon and, so far, there have been demonstrated various kinds of catalyst aiming at improving the purification property. For example, some catalysts using cerium (Ce) have been disclosed in Japanese Published Examined Patent Application Nos. 41775/1984 and 20307/1983, and Japanese Published Unexamined Patent Application No. 90695/1984. In these catalysts using cerium, the cerium is present in the oxide form. The cerium improves the purification property by discharging or storing oxygen (oxygen storing capability) according to the reaction shown in the formula (1) and by controlling the oxidation reaction of CO and HC and the deoxidation reaction of NOx.

$$CeO_2 \rightleftharpoons CeO_{2-x} + \frac{x}{2} O_2 \qquad (1)$$

It has been known that the reaction shown in the formula (1) appears on the particle surface of cerium oxide. However, in the aforesaid conventional catalysts for purifying exhaust gases, the total surface area of the cerium oxide particles was reduced by the growth of the cerium oxide particles on using the conventional catalysts at elavated temperatures over 800° C. Accordingly, there has been arised a disadvantage that the purification property is degraded due to the worsening of the oxygen storing capability.

Also, some catalysts using rare earths and transition metals simultaneously with cerium for aiming at the stabilization of active alumina, were disclosed in Japanese Published Examined Patent Application No. 7537/1985, Japanese Published Unexamined Patent Application Nos. 18180/1973 and 3531/1986, U.S. Pat. Nos. 3951860 and 4170573. For example, a catalyst disclosed in Japanese Published Examined Patent Application No. 7537/1985 has used cerium with lanthanum (La) and formed a composite oxide shown in the formula (2).

$$Ce_{1-x} La_x O_{2-\frac{x}{2}} \qquad (2)$$

$$(0.3 \leq x \leq 0.5)$$

In this catalyst for purifying exhaust gases of the formula (2), a lattice defect with oxygen vacancies is formed in the fluorite structure of the composite oxide, so that the oxygen storing capability with durability can be achieved. However, even in this catalyst for purifying exhaust gases of the formula (2), the growth of particles, which is not so much as that of the formula (1), is increased in the cerium oxide and the purification property is worsened. In this catalyst for purifying exhaust gases of the formula (2), the volume of lanthanum is contracted since $LaAlO_3$ was formed at elevated temperatures. Therefore, internal stress is produced in the alumina catalyst carrier layer and depositiong strength is degraded between the alumina catalyst carrier layer and the support substrate. Thus degraded depositing strength causes another disadvantage that the alumina catalyst carrier layer is peeled off.

Accordingly, it is an object of this invention to provide a catalyst for the purification of exhaust gases capable of ensuring the excellent purification property by suppressing the growth of cerium oxide particles at elevated temperatures, and also capable of preventing the formation of $LaAlO_3$.

SUMMARY OF THE INVENTION

A catalyst for the purification of exhaust gases of this invention has two composition types. One is a binary composition catalyst for the purification of exhaust gases (hereinafter, referred to as "binary catalyst") and the other is a ternary composition catalyst for the purification of exhaust gases (hereinafter referred to as "ternary catalyst").

In the binary catalyst, a catalyst carrier layer comprises oxides of cerium and zirconium, and at least a part of each oxide is present in the form of composite oxide and/or solid solution.

On the other hand, in the ternary catalyst, a catalyst carrier layer comprises oxides of cerium, zirconium and lanthanum, and at least a part of each oxide is present in the form of composite oxide and/or solid solution.

In these two composition types of catalyst, the growth of cerium oxide particles is suppressed since at least a part of each oxide is present in the form of composite oxide and/or solid solution as described above. Further, the oxygen mobility within the composite oxide crystal is facilitated and the excellent oxygen storing capability is ensured since the crystal structure of the composite oxide has a lattice defect with oxygen vacancies. Also, the growth of cerium oxide particles is suppressed on using at elevated temperatures, so that the excellent purification property can be achieved since the cerium oxide has a large surface area.

Accordingly, the disadvantage of worsening the oxygen storing capability of cerium oxide is eliminated, and therefore the excellent purification property can be ensured for a long period.

Moreover, in the ternary catalyst of this invention, the formation of $LaAlO_3$ is prevented and therefore the volume contraction resulted by the formation of $LaAlO_3$ is prevented. Accordingly, no internal stress is produced in the catalyst carrier layer and the sufficient deposition strength can be ensured between the catalyst carrier layer and the support substrate. While, the growth of alumina particles can be suppressed since a proper amount of lanthanum atom enters into the alumina particles.

BRIEF DESCRIPTION OF THE DRAWING

An accompanied FIGURE is a graph showing the relationship between the temperatures of the heat treatment and the strength ratio of X-ray diffraction indicating the amount of $LaAlO_3$.

DETAILED DESCRIPTION OF THE INVENTION

Figure 1:
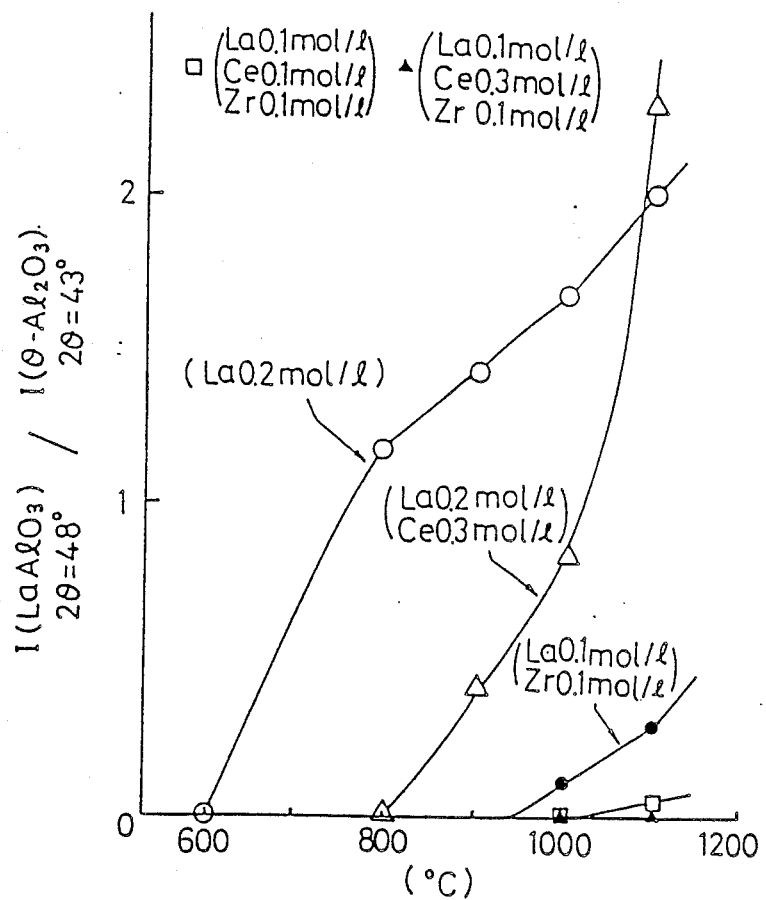

The binary catalyst of this invention comprises a catalyst carrier layer and catalyst ingredients carried thereon. The catalyst carrier layer comprises oxides of cerium and zirconium, and at least a part of each oxide is present in the form of composite oxide and/or solid solution. That is, at least 5% by weight of each oxide is present in the form of composite oxide and/or solid solution. While, the oxide of cerium, the oxide of zirconium and the composite oxide and/or solid solution can be present together.

On the other hand, the ternary catalyst of this invention comprises a catalyst carrier layer and catalyst ingredients carried thereon. The catalyst carrier layer comprises oxides of cerium, zirconium and lanthanum, and at least a part of each oxide is present in the form of composite oxide and/or solid solution. Preferably, at least 5% by weight of each oxide is present in the form of composite oxide and/or solid solution. Further, the oxide of cerium, the oxide of zirconium, the oxide of lanthanum and the composite oxide and/or solid solution can be present together. The composite oxide and/or solid solution of this invention means the following composite oxides and/or solid solutions: a composite oxide and/or solid solution composed of cerium oxide and lanthanum oxide; a composite oxide and/or solid solution composed of cerium oxide and zirconium oxide; a composite oxide and/or solid solution composed of zirconium oxide and lanthanum oxide; a composite oxide and/or solid solution composed of cerium oxide, zirconium oxide and lanthanum oxide; a composite oxide and/or solid solution composed of mixtures of the above composite oxides and/or solid solutions;

In both binary and ternary catalysts, for the catalyst carrier layer, such substances having a large specific surface area as active alumina, zirconia, titanium oxide and the like can be used. However, gamma-alumina and theta-alumina are generally used for the catalyst carrier layer. The catalyst carrier layer may be used as it is or used as formed on the surface of a support substrate. For the support substrate, a conventional substrate such as a honeycomb shape monolithic support substrate and a pellet shape support substrate can be used. For the material of the support substrate, well known ceramics such as cordierite, mullite, alumina, magnesia and spinel or well known heat resistant metals such as ferritic steel can be used.

Alos, for the catalyst ingredients carried on the catalyst carrier layer, the conventionally employed ones can be used, e.g., noble metals such as platinum (Pt), rhodium (Rh), palladium (Pd), iridium (Ir), ruthenium (Ru), osmium (Os) and the like, and base metals such as chromium (Cr), nickel (Ni), vanadium (V), copper (Cu), cobalt (Co), manganese (Mn) and the like.

The growth of cerium oxide particles is facilitated when the cerium oxide alone is present. For example, our research has demonstrated that a diameter of the cerium oxide particles increases up to about 0.1 μm diameter when heated at 1000° C. Accordingly, even if the purification of CO is conducted according to the reaction formula (3) after heated at 1000° C., the reaction ratio becomes almost zero and the oxygen storing capability is lowered remarkably.

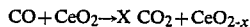

$$CO + CeO_2 \rightarrow X\ CO_2 + CeO_{2-x} \quad (3)$$

We have continued our research and then found that the growth of cerium oxide particles is suppressed remarkably and the reaction ratio of the reaction formula (3) shows a high ratio of not less than 70% after heated at elevated temperatures in case that cerium oxide and zirconium oxide are applied together to the heat treatment. In this manner, we have obtained the binary catalyst of this invention.

Further, we have found that the oxygen storing capability is ensured even after heated at elevated temperatures and a catalyst carrier layer is not peeled off from a support substrate in case that cerium oxide, zirconium oxide and lanthanum oxide are applied together to the heat treatment. Thus, we have obtained the ternary catalyst of this invention.

In the binary catalyst, we moistened cerium oxide powder with an aqueous solution of zirconium oxynitrate and on the other hand, moistened zirconium oxide powder with an aqueous solution of cerium nitrate, and then analyzed each crystal form by the X-ray diffraction after each moistened powder was applied to the heat treatment at 800° C. for 5 hours. The results are shown in Table 9. In case that the cerium oxide powder was moistened with the aqueous solution of zirconium oxynitrate, the cerium oxide crystal phase appeared and the lattice constant was short. It means that zirconium is displaced to the cerium oxide crystal lattice and solid dissolved, therein. While, in case that the zirconium oxide powder was moistened with the aqueous solution of cerium nitrate, no exact lattice constant could be obtained since three types of phase appeared. It means that a part of each zirconium oxide and cerium oxide is present in the form of composite oxide and/or solid solution.

TABLE 9

| Sample | Crystal System | Lattice Constant (Å) |
|---|---|---|
| CeO$_2$ powder | cubic crystal | 5.414 |
| CeO$_2$ + Zr (20 mol %) | ↑ | 5.404 |
| CeO$_2$ + Zr (40 mol %) | ↑ | 5.405 |
| ZrO$_2$ + Ce (40 mol %) | cubic crystal (CeO$_2$) + tetragonal crystal (ZrO$_2$) + monoclinic crystal (ZrO$_2$) | — |
| ZrO$_2$ + Ce (20 mol %) | same as above | — |
| ZrO$_2$ | monoclinic crystal | — |

The composite oxide and/or solid solution having oxides of cerium and zirconium can be formed in a catalyst carrier layer by moistening the catalyst carrier layer with two kinds of aqueous solution of cerium chloride and zirconate simultaneously or separately and burning at temperatures not less than 600° C. Also, the composite oxide and/or solid solution can be formed by mixing the cerium and the zirconium with active alumina powder when the catalyst carrier layer is formed, and burning at tempertures not less than 800° C. In this place, at least one of the cerium and the zirconium is in the oxide form. If the burning temperature is less than the above mentioned value, the formation of the composite oxide and/or solid solution becomes difficult and therefore the growth of cerium oxide particles is facilitated.

It is preferred that cerium oxide and zirconium oxide are present in the form of composite oxide and/or solid solution on the whole, however, the growth of cerium oxide particles can be suppressed effectively even if at least a part of them are present in the form of composite oxide and/or solid solution. The cerium oxide and zirconium oxide may be present within a catalyst carrier layer or carried on the surface of the carrier layer. If they are present on the surface of the carrier layer, the catalyst property is improved remarkably since the contact with exhaust gases is facilitated and the oxygen storing capability is fully demonstrated.

There is no special limitation on the ratio between the cerium and the zirconium, however, it is preferred that the ratio of atoms between the zirconium and the cerium present in the form of composite oxide and/or solid solution is 5:95 to 80:20. If the ratio of atoms is less than 5:95, it facilitates the growth of cerium oxide particles and on the other hand, in excess of 80:20, the purification property is worsened since the oxygen storing capability is worsened.

In the ternary catalyst, we moistened theta-alumina powder with an aqueous solution of lanthanum nitrate alone, an mixed aqueous solution of lanthanum nitrate and cerium nitrate, an mixed aqueous solution of lanthanum nitrate and zirconium oxynitrate, a mixed aqueous solution of lanthanum nitrate, cerium nitrate and zirconium oxynitrate separately, and then applied each moistened powder to the heat treatment in air for 5 hours while varying temperature of the heat treatment. Thereafter, we identified $LaAlO_3$ in each moistened powder by the X-ray diffraction. FIG. 1 shows the results. In FIG. 1, the X-ray diffraction strength ratio of $LaAlO_3$ based on theta-alumina is shown on the ordinate, while the temperatures of the heat treatment is shown on the abscissa.

As can be seen from FIG. 1, the lanthanum alone or lanthanum-cerium mixtures type start to form $LaAlO_3$ from the temperatures 800° to 900° C., however, the lanthanum-cerium-zirconium mixtures type hardly form $LaAlO_3$ even heated at 1100° C. Therefore, the composite oxide and/or solid solution of the lanthanum-cerium-zirconium mixtures type is preferred.

The composite oxide and/or solid solution having at least a part of each oxide of cerium, zirconium and lanthanum can be formed in a catalyst carrier layer by moistening the catalyst carrier layer with three kinds of aqueous solution of cerium chloride, zirconate and lanthanate simultaneously or separately and burning at temperatures not less than 600° C. Also, the composite oxide and/or solid solution can be formed by mixing the cerium, the zirconium and the lanthanum with active alumina powder when the catalyst carrier layer is formed, and burning at temperatures not less than 800° C. In this place, at least one of the cerium, the zirconium and the lanthanum is in the oxide form. If the burning temperature is less than the above mentioned value, the formation of the composite oxide and/or solid solution becomes difficult and the growth of cerium oxide particles resulting the formation of $LaAlO_3$ is facilitated.

Oxides of cerium, zirconium and lanthanum may be present within a catalyst carrier layer or carried on the surface of the carrier layer. If they are present on the surface of the carrier layer, the excellent purification property is ensured and the formation of $LaAlO_3$ is prevented completely.

There is no special limitation on the composition ratio between cerium, zirconium and lanthanum, however, it is preferred that the cerium, the zirconium and the lanthanum present in the form of the composite oxide and/or solid solution are in such ratios that the numbers of atoms of zirconium and lanthanum are 5 to 100 and 5 to 150, respectively, based on 100 atoms of cerium. In the above ratio, if the zirconium atom is less than 5, it facilitates the growth of cerium oxide particles and the formation of $LaAlO_3$. While, if the zirconium atom exceeds 100, the cerium atom is decreased relatively and the oxygen storing capability according to the formula (1) is worsened and therefore the purification property is lowered. If the lanthanum atom is less than 5, the oxygen sotring capability, which is ensured by the lattice defect with oxygen vacancies in the crystal structure of a composite oxide, is worsened and it facilitates the growth of alumina particles. On the other hand, in excess of 150, the cerium atom is decreased relatively and the oxygen storing capability according to the formula (1) is worsened and therefore the purification property is lowered.

Now, the binary catalyst of this invention will be described according to the following Operation Examples 1 to 8 and Comparative Examples 1 to 8.

OPERATION EXAMPLE 1, COMPARATIVE EXAMPLE 1

700 g of aluminasol with 10% by weight of alumina content ratio, 1000 g of alumina powder and 300 g of distilled water were mixed and stirred to make slurry. Then, a honeycomb shape monolithic catalyst support substrate comprising cordierite was immersed in the slurry for 1 minute. After taking out of the slurry, the monolithic catalyst support substrate was subjected to the air jet to blow off the slurry in a cell, dried at 150° C. for 1 hour, and burned at 700° C. for 2 hours. This process was repeated twice and then a catalyst carrier layer comprising active alumina was formed on the support substrate. In the next place, the monolithic support substrate forming the above catalyst carrier layer thereon, was immersed for 1 minute in a mixed aqueous solution in which 0.08 mol/l of cerium nitrate and 0.32 mol/l of zirconium oxynitrate were dissolved. After taking out of the mixed aqueous solution, the excessive water was blown off and the monolithic support substrate was dried at 200° C. for 3 hours and burned at 600° C. in air for 5 hours. Then, a monolithic support substrate (1A) having the catalyst carrier layer containing cerium oxide and zirconium oxide was obtained.

Monolithic support substrates (1B to 1E) containing cerium atom and zirconium atom with the values shown in Table 1 were obtained in the same manner as the monolithic support substrate (1A) except for using a mixed aqueous solution with different concentration of cerium nitrate and zirconium oxynitrate. Then, a monolithic support substrate (1F) was obtained in the same manner except for immersing a monolithic support substrate in only an aqueous solution containing 0.4 mol/l of cerium nitrate without using the aqueous solution of zirconium oxynitrate. Further, the monolithic support substrate (1G) was obtained in the same manner except for immersing a monolithic support substrate in only an aqueous solution containing 0.4 mol/l of zirconium oxynitrate without using the aqueous solution of cerium nitrate.

Next, these obtained monolithic support substrates (1A to 1G) were Immersed in distilled water and taken out of the water after the water was well absorbed thereinto. Then, they were immersed for 1 hour in an aqueous solution containing 1.0 g/l of dinitrodiamine platinum after the excessive water was blown off, and then taken out of the aqueous solution and again the excessive water was blown off. Thereafter, they were dried at 200° C. for 1 hour. Further, they were immersed in an aqueous solution containing a 0.1 g/l of rhodium chloride in the same manner as above. After dried, platinum (Pt) and rhodium (Rh) were carried thereon. Then, each binary catalyst of operation examples 1a to 1e and comparative examples 1a to 1b as shown in Table 1 was obtained.

Also, each binary catalyst of operation examples 1f to 1j and comparative examples 1c to 1d as shown in Table 2 was obtained by using the above monolithic support substrates (1A to 1G), an aqueous solution containing 1.5 g/l of palladium chloride and an aqueous solution containing 0.2 g/l of rhodium chloride, and by carrying paradium (Pd) and rhodium (Rh) on each substrate in the same manner as above.

Further, each binary catalyst of operation examples 1k to 1o and comparative examples 1e to 1f as shown in Table 3 was obtained by using the above monolithic support substrates (1A to 1G), an aqueous solution containing 1.0 g/l of dinitrodiamine platinum, an aqueous solution containing 1.0 g/l of palladium chloride and an aqueous solution containing 0.2 g/l of rhodium chloride, and by carrying platinum, palladium and rhodium on each substrate in the same manner as above.

Each obtained binary catalyst was attached to an exhaust system of a 3 litre 6 cylindered in-line engine and an endurance test was conducted for 200 hours under the conditions of the air-fuel ratio (A/F)=14.6 and the intake gas temperature=850° C. After applied to the endurance test, each of the binary catalyst was attached to the exhaust system of an identical engine and the purification ratio was measured for hydrocarbon (HC), carbon monoxide (CO) and nitrogen oxides (NOx) under the conditions of the air-fuel ratio (A/F)=14.6 and the intake gas temperature=400° C.

Also, the oxygen storing capability was measured by the following steps; First, the above monolithic support substrates (1A to 1G) before carrying the catalyst ingredients thereon were heated at 1000° C. for 5 hours. They were heated at 600° C. in an oxidative atomosphere, then carbon monoxide (CO) was intermittently pured into the oxidative atmosphere while fixing a temperature at 600° C. Thus, the CO conversion ratio was obtained from the amount of carbon dioxide formed in the oxidatiive atmosphere according to the aforesaid formula (3). Then, the oxygen storing capability was measured through the obtained CO conversion ratio.

Further, the above support substrates heated at 1000° C. for 5 hours were atomized, then a particle diameter of cerium oxide was measured by the X-ray diffraction. The results are shown collectively in Tables 1 to 3.

TABLE 1

| support substrate | Operation Example 1 | | | | | Comparative Example 1 | |
|---|---|---|---|---|---|---|---|
| | 1a 1A | 1b 1B | 1c 1C | 1d 1D | 1e 1E | 1a 1F | 1b 1G |
| Ce (mol/l) | 0.08 | 0.16 | 0.20 | 0.24 | 0.32 | 0.4 | — |
| Zr (mol/l) | 0.32 | 0.24 | 0.20 | 0.16 | 0.08 | — | 0.4 |
| Pt (g/l) | 1.0 | ← | ← | ← | ← | ← | ← |
| Rh (g/l) | 0.1 | ← | ← | ← | ← | ← | ← |
| HC purification ratio (%) | 92 | 93 | 92 | 91 | 91 | 88 | 90 |
| CO purification ratio (%) | 85 | 88 | 90 | 89 | 88 | 78 | 69 |
| NOx purification ratio (%) | 87 | 88 | 89 | 88 | 89 | 80 | 71 |

TABLE 1-continued

| support substrate | Operation Example 1 | | | | | Comparative Example 1 | |
|---|---|---|---|---|---|---|---|
| | 1a 1A | 1b 1B | 1c 1C | 1d 1D | 1e 1E | 1a 1F | 1b 1G |
| CO conversion ratio (%) | 72 | 78 | 79 | 79 | 80 | 10 | 0 |
| particle diameter (nm) | 13 | 13 | 14 | 15 | 10 | 110 | 30 |

TABLE 2

| support substrate | Operation Example 1 | | | | | Comparative Example 1 | |
|---|---|---|---|---|---|---|---|
| | 1f 1A | 1g 1B | 1h 1C | 1i 1D | 1j 1E | 1c 1F | 1d 1G |
| Pd (g/l) | 1.5 | ← | ← | ← | ← | ← | ← |
| Rh (g/l) | 0.2 | ← | ← | ← | ← | ← | ← |
| HC purification ratio (%) | 95 | 94 | 95 | 94 | 93 | 89 | 88 |
| CO purification ratio (%) | 83 | 86 | 90 | 90 | 89 | 71 | 68 |
| NOx purification ratio (%) | 86 | 87 | 87 | 88 | 88 | 73 | 71 |

TABLE 3

| support substrate | Operation Example 1 | | | | | Comparative Example 1 | |
|---|---|---|---|---|---|---|---|
| | 1k 1A | 1l 1B | 1m 1C | 1n 1D | 1o 1E | 1e 1F | 1f 1G |
| Pt (g/l) | 1.0 | ← | ← | ← | ← | ← | ← |
| Pd (g/l) | 1.0 | ← | ← | ← | ← | ← | ← |
| Rh (g/l) | 0.2 | ← | ← | ← | ← | ← | ← |
| HC purification ratio (%) | 94 | 93 | 94 | 93 | 92 | 87 | 88 |
| CO purification ratio (%) | 92 | 94 | 95 | 95 | 96 | 89 | 76 |
| NOx purification ratio (%) | 91 | 93 | 94 | 93 | 94 | 88 | 78 |

OPERATION EXAMPLE 2, COMPARATIVE EXAMPLE 2

Each support substrate was obtained in the same manner of immersing, drying and burning as Operation Example 1 and Comparative Example 1 except for using a mixed aqueous solution with different concentration and 1 l of gamma-alumina grained support (manufactured by Nikki Universal Co.) having 100 to 150 $m^2/g$ of BET surface area and 300 to 400 angstrom of average pore diameter. Then, catalyst ingredients were carried on each obtained support substrate in the same manner as operation examples 1a to 1e and comparative examples 1a to 1b. Thus, binary catalysts of operation examples 2a to 2e and comparative examples 2a to 2b as shown in Table 4 were obtained. The purification ratio of thus obtained binary catalysts was measured in the same manner as Operation Example 1 and the results were shown in Table 4.

TABLE 4

| | Operation Example 2 | | | | | Comparative Example 2 | |
|---|---|---|---|---|---|---|---|
| | 2a | 2b | 2c | 2d | 2e | 2a | 2b |
| Ce (mol/l) | 0.06 | 0.18 | 0.30 | 0.42 | 0.54 | 0.6 | — |
| Zr (mol/l) | 0.54 | 0.42 | 0.30 | 0.18 | 0.06 | — | 0.6 |
| Pt (g/l) | 1.0 | ← | ← | ← | ← | ← | ← |
| Rh (g/l) | 0.1 | ← | ← | ← | ← | ← | ← |
| HC purification ratio (%) | 88 | 87 | 89 | 86 | 83 | 81 | 75 |

TABLE 4-continued

|  | Operation Example 2 | | | | | Comparative Example 2 | |
|---|---|---|---|---|---|---|---|
|  | 2a | 2b | 2c | 2d | 2e | 2a | 2b |
| CO purification ratio (%) | 79 | 85 | 87 | 89 | 91 | 75 | 66 |
| NOx purification ratio (%) | 82 | 88 | 89 | 88 | 89 | 78 | 68 |

OPERATION EXAMPLE 3, COMPARATIVE EXAMPLE 3

Before carrying catalyst ingredients thereon, each grained support substrate having the cerium atom and zirconium atom burned at 600° C. in Operation Example 2 and Comparative Example 2, was atomized into a powder with 7 μm of average particle diameter by a vibration mill. Nextly, 100 weight parts of each obtained powder, 30 weight parts of aqueous solution containing 40% by weight of aluminum nitrate and 100 weight parts of water were mixed and milled for 1 hour, then each slurry was obtained. Thereafter, catalyst carrier layers were formed on the same honeycomb supports as those of Operation Example 1 in the same manner as Operation Example 1 by using each obtained slurry, then catalyst ingredients were carried in the same manner as operation examples 1a to 1e and comparative examples 1a to 1b. In this manner, each binary catalyst of operation examples 3a to 3e and comparative examples 3a to 3b shown in Table 5 was obtained.

The purification ratio of the obtained binary catalysts was measured in the same manner as Operation Example 1 and the results were shown in Table 5.

TABLE 5

|  | Operation Example 3 | | | | | Comparative Example 3 | |
|---|---|---|---|---|---|---|---|
|  | 3a | 3b | 3c | 3d | 3e | 3a | 3b |
| Ce (mol/l) | 0.04 | 0.08 | 0.10 | 0.12 | 0.16 | 0.2 | — |
| Zr (mol/l) | 0.16 | 0.12 | 0.10 | 0.08 | 0.04 | — | 0.2 |
| Pt (g/l) | 1.5 | ← | ← | ← | ← | ← | ← |
| Rh (g/l) | 0.3 | ← | ← | ← | ← | ← | ← |
| HC purification ratio (%) | 94 | 94 | 95 | 94 | 93 | 89 | 87 |
| CO purification ratio (%) | 91 | 93 | 94 | 95 | 93 | 86 | 82 |
| NOx purification ratio (%) | 93 | 94 | 93 | 94 | 94 | 87 | 84 |

OPERATION EXAMPLE 4, COMPARATIVE EXAMPLE 4

Gamma-alumina powder obtained by atomizing the grained support used in Operation Example 3 and zirconium oxide powder were combined according to the composition ratio shown in Table 6. Then, the combined powder was mixed with water to make slurry and catalyst carrier layers were formed in the same manner as Operation Example 3. After immersed in two kinds of cerium nitrate aqueous solution with different concentration, each support substrate was burned at 800° C. for 5 hours and catalyst ingredients were carried thereon in the same manner as operation examples 1k to 1o. Then, each binary catalyst of operation examples 4a to 4b shown in Table 6 was obtained. While, in Comparative Example 4, the cerium nitrate aqueous solution was not used for the immersion.

The purification ratio of the obtained binary catalysts was measured in the same manner as Operation Example 1 and the results were shown in Table 6.

OPERATION EXAMPLE 5, COMPARATIVE EXAMPLE 5

Each binary catalyst of operation examples 5a to 5b and comparative example 5 shown in Table 6 was obtained in the same manner as Operation Example 4 and Comparative Example 4 except for using cerium oxide powder and zirconium oxychloride instead of zirconium oxide powder and cerium nitrate.

The purification ratio of the obtained binary catalysts was measured in the same manner as Operation Example 1 and the results were shown in Table 6.

TABLE 6

|  | Operation Example 4 | | Comparative Example 4 | Operation Example 5 | | Comparative Example 5 |
|---|---|---|---|---|---|---|
|  | 4a | 4b |  | 5a | 5b |  |
| Ce (mol/l) | 0.10 | 0.20 | — | 0.30 | 0.30 | 0.30 |
| Zr (mol/l) | 0.40 | 0.40 | 0.40 | 0.10 | 0.30 | — |
| Pt (g/l) | 1.0 | ← | ← | — | — | — |
| Pd (g/l) | 1.0 | ← | ← | 1.5 | ← | ← |
| Rh (g/l) | 0.2 | ← | ← | 0.2 | ← | ← |
| HC purification ratio (%) | 95 | 94 | 88 | 94 | 95 | 91 |
| CO purification ratio (%) | 94 | 95 | 78 | 91 | 93 | 70 |
| NOx purification ratio (%) | 92 | 93 | 78 | 90 | 91 | 71 |

OPERATION EXAMPLE 6, COMPARATIVE EXAMPLE 6

Each binary catalyst of operation examples 6a to 6b and comparative examples 6a to 6b shown in Table 7 was obtained in the same manner as Operation Example 3 and Comparative Example 3 except for making slurry by using mixtures of water and combined powder in which zirconium oxide powder, cerium oxide powder and alumina powder were combined according to the composition ratio shown in Table 7.

The purification ratio of the obtained binary catalysts was measured in the same manner as Operation Example 1 and the results where shown in Table 7.

OPERATION EXAMPLE 7, COMPARATIVE EXAMPLE 7

Each binary catalyst of operation examples 7a to 7b and Comparative Example 7 shown in Table 7 was obtained in the same manner as Operation Example 1 and Comparative Example 1 except for using a ferrite type metal honeycomb support substrate containing alumina instead of a cordierite type honeycomb support substrate.

The purification ratio of the obtained binary catalysts was measured in the same manner as Operation Example 1 and the results were shown in Table 7.

TABLE 7

|  | Operation Example 6 | | Comparative Example 6 | | Operation Example 7 | | Comparative Example 7 |
|---|---|---|---|---|---|---|---|
|  | 6a | 6b | 6a | 6b | 7a | 7b |  |
| Ce (mol/l) | 0.10 | 0.20 | 0.20 | — | 0.10 | 0.20 | 0.3 |
| Zr (mol/l) | 0.20 | 0.10 | — | 0.20 | 0.20 | 0.10 | — |
| Pt (g/l) | — | — | — | — | 1.5 | 1.5 | ← |
| Pd (g/l) | 2.0 | ← | ← | ← | — | — | — |
| Rh (g/l) | 0.3 | ← | ← | ← | 0.3 | ← | ← |

TABLE 7-continued

|  | Operation Example 6 | | Comparative Example 6 | | Operation Example 7 | | Comparative Example 7 |
| --- | --- | --- | --- | --- | --- | --- | --- |
|  | 6a | 6b | 6a | 6b | 7a | 7b |  |
| HC purification ratio (%) | 96 | 94 | 91 | 88 | 93 | 92 | 88 |
| CO purification ratio (%) | 91 | 92 | 86 | 83 | 91 | 93 | 85 |
| NOx purification ratio (%) | 93 | 92 | 86 | 84 | 93 | 94 | 84 |

OPERATION EXAMPLE 8, COMPARATIVE EXAMPLE 8

A ferrite type metal honeycomb support substrate comprising 5% by weight of aluminum, 20% by weight of chrome and the balance of iron was applied to the heat treatment for 10 minutes at 900° C. in a carbon dioxide atmosphere, then for 1 hour at 900° C. in air. Thereafter a catalyst carrier layer of active alumina was formed on the surface of the support substrate in the same manner as Operation Example 1 and Comparative Example 1. Then, each binary catalyst of operation examples 8a to 8b and comparative examples 8a to 8b shown in Table 8 was obtained by using the above obtained support substrate.

The purification ratio of the obtained binary catalysts was measured in the same manner as Operation Example 1 and the results were shown in Table 8.

TABLE 8

|  | Operation Example 8 | | Comparative Example 8 | |
| --- | --- | --- | --- | --- |
|  | 8a | 8b | 8a | 8b |
| Ce (mol/l) | 0.05 | 0.15 | 0.2 | — |
| Zr (mol/l) | 0.15 | 0.05 | — | 0.2 |
| Pt (mol/l) | 1.0 | ← | ← | ← |
| Rh (mol/l) | 0.1 | ← | ← | ← |
| HC purification ratio (%) | 78 | 79 | 71 | 68 |
| CO purification ratio (%) | 76 | 78 | 70 | 65 |
| NOx purification ratio (%) | 75 | 77 | 69 | 64 |

As can be seen from the Tables (Tables 1 to 8), all operation examples are superior to comparative examples in respect of the purification ratio. That is because at least a part of cerium oxide and zirconium oxide is present in the form of composite oxide and/or solid solution in the binary catalyst of each operation example.

In the binary catalyst of the operation example in Table 1 and, the growth of cerium oxide particles hardly appears, and, therefore, an excellent CO conversion ratio (oxygen storing capability) can be achieved. Also, Table 1 shows a tendency that a particle diameter becomes small according to the increase of the mol ratio of zirconium atom to cerium atom and the CO conversion ratio becomes low.

Now, the ternary catalyst of this invention will be discribed according to the following Operation Examples 9 to 12 and Comparative Examples 9 to 12.

OPERATION EXAMPLE 9, COMPARATIVE EXAMPLE 9

700 g of aluminasol containing 10% by weight of alumina, 1000 g of alumina powder and 300 g of distilled water were mixed and stirred to make slurry. Then a cordierite type honeycomb shape monolithic catalyst support substrate was immersed in the above slurry for 1 minute. After taking out of the slurry, the slurry in a cell was blown off by air jet, then the support substrate was dried at 150° C. for 1 hour and burned at 700° C. for 2 hours. The above process was repeated twice and then a catalyst carrier layer of active alumina was formed on the support substrate. In the next place, the monolithic support substrate having the above catalyst carrier layer thereon, was immersed for 1 minute in a mixed aqueous solution of 0.05 mol/l of cerium nitrate, 0.15 mol/l of zirconium oxynitrate and 0.05 mol/l of lanthanum nitrate. After taking out of the mixed aqueous solution, the excessive water was blown off. Then, the monolithic support substrate was dried at 200° C. for 3 hours and burned at 600° C. for 5 hours. In this manner, a monolithic support substrate(A) containing cerium oxide, zirconium oxide and lanthanum oxide was obtained.

Each of the monolithic support substrates (B to E) containing cerium oxide, zirconium oxide and lanthanum oxide with the respective value shown in Table 10, was obtained in the same manner as the support substrate (A) except for using a mixed aqueous solution with different concentration of cerium nitrate, zirconium oxynitrate and lanthanum nitrate. Further, a monolithic support substrate (F) was obtained in the same manner as the substrate (A) except for immersing only in an aqueous solution containing 0.3 mol/l of cerium nitrate, and a monolithic support substrate (G) was also obtained in the same manner except for immersing in a mixed aqueous solution containing 0.3 mol/l of cerium nitrate and 0.2 mol/l of lanthanum nitrate without using the zirconium oxynitrate aqueous solution.

Next, catalyst ingredients as shown in Table 10 were deposited on those monolithic support substrates (A to G). To deposit the catalyst ingredients, those support substrates were immersed in distilled water and taken out of the water after the water was well absorbed thereinto. After blowing off the excessive water, those support substrates were immersed respectively in an aqueous solution containing dinitrodiamine platinum to deposit platinum, an aqueous solution containing rhodium chloride to deposit rhodium and an aqueous solution containing palladium chloride to deposit palladium. After 1 hour immersing, they were taken out of the respective aqueous solution and the excessive water was blown off. Then, each support substrate was dried at 200° C. for 1 hour. In this manner, platinum (Pt), rhodium (Rh), and palladium (Pd) were deposited on the support substrates, and the ternary catalysts of operation examples 9a to 9e and comparative examples 9a to 9b shown in Table 10 was obtained.

Each thus obtained ternary catalyst was attached to an exhaust system of a 3 litre 6 cylindered in-line engine and an endurance test was conducted for 200 hours under the conditions of the air-fuel ratio (A/F)=14.6 and the intake gas temperature=850° C. After applying to the endurance test, each of the ternary catalysts was attached to the exhaust system of an identical engine and the purification ratio was measured for hydrocarbon (HC), carbon monoxide (CO) and nitrogen oxides (NOx) under the conditions of the air-fuel ratio (A/F)=14.6 and the intake gas temperature=400° C.

Next, each ternary catalyst was subjected to an endurance test for 100 hours while fixing the intake gas temperature at 1000° C. by a gas burner. Then, the catalyst carrier layer was measured for a peeling off amount from the weight difference between before and after the endurance test.

Further, each support substrate was atomized after heated at 1000° C. for 100 hours in the above endurance test and then a particle diameter of cerium oxide was measured by the X-ray diffraction. The results were collectively shown in Table 10.

TABLE 10

| support substrate | Operation Example 9 | | | | | Comparative Example 9 | |
|---|---|---|---|---|---|---|---|
| | 9a A | 9b B | 9c C | 9d D | 9e E | 9a F | 9b G |
| Ce (mol/l) | 0.05 | 0.30 | 0.10 | 0.10 | 0.30 | 0.30 | 0.30 |
| Zr (mol/l) | 0.15 | 0.15 | 0.10 | 0.10 | 0.20 | — | — |
| La (mol/l) | 0.05 | 0.10 | 0.10 | 0.10 | 0.20 | — | 0.20 |
| Pt (g/l) | 1.5 | 1.5 | 1.5 | 1.0 | — | 1.5 | 1.5 |
| Pd (g/l) | — | — | — | 1.0 | 1.5 | — | — |
| Rh (g/l) | 0.3 | 0.3 | 0.3 | 0.3 | 0.3 | 0.3 | 0.3 |
| HC purification ratio (%) | 94 | 93 | 95 | 92 | 91 | 84 | 88 |
| CO purification ratio (%) | 92 | 94 | 93 | 93 | 89 | 83 | 89 |
| NOx purification ratio (%) | 93 | 95 | 93 | 92 | 90 | 84 | 89 |
| carrier layer omission rate (%) | 2 | 1 | 0 | 0 | 1 | 11 | 16 |
| particle diameter (nm) | 12 | 13 | 11 | 11 | 14 | 150 | 120 |

OPERATION EXAMPLE 10, COMPARATIVE EXAMPLE 10

First, 1 of gamma-alumina grained support (manufactured by Nikki Universal Co.) having 100 to 150 m²/g of BET surface area and 300 to 400 angstrom of average pore diameter, was immersed in the same mixed aqueous solution as Operation Example 9 and Comparative Example 9 except for concentration. After dried and burned, each obtained grained support was atomized into a powder with 7 μm of average particle diameter by a vibration mill. Next, 100 weight parts of each obtained powder, 30 weight parts of an aqueous solution containing 40% by weight of alumina nitrate and 100 weight parts of water were mixed and milled for 1 hour, then each slurry was obtained. Thereafter, catalyst carrier layers were formed on the same honeycomb support substrates as those of Operation Example 9 in the same manner by using each obtained slurry. When necessary, each amount of cerium, zirconium and lanthanum can be adjusted by spraying the aforesaid mixed aqueous solution and moistening the catalyst carrier layers with the aforesaid mixed aqueous solution.

After depositing catalyst ingredients thereon in the same manner as operation examples 9a to 9e and comparative examples 9a to 9b, each catalyst of operation examples 10a to 10e and comparative examples 10a to 10b as shown in Table 11 was obtained. Then, each obtained ternary catalyst was applied to the same test as Operation Example 9 and the results were shown in Table 11.

TABLE 11

| | Operation Example 10 | | | | | Comparative Example 10 | |
|---|---|---|---|---|---|---|---|
| | 10a | 10b | 10c | 10d | 10e | 10a | 10b |
| Ce (mol/l) | 0.05 | 0.15 | 0.20 | 0.20 | 0.30 | 0.30 | 0.20 |
| Zr (mol/l) | 0.10 | 0.10 | 0.20 | 0.10 | 0.20 | — | — |
| La (mol/l) | 0.10 | 0.10 | 0.10 | 0.20 | 0.10 | — | 0.10 |
| Pt (g/l) | 1.0 | ← | — | — | 0.5 | 1.0 | — |

TABLE 11-continued

| | Operation Example 10 | | | | | Comparative Example 10 | |
|---|---|---|---|---|---|---|---|
| | 10a | 10b | 10c | 10d | 10e | 10a | 10b |
| Pd (g/l) | — | — | 1.0 | ← | 0.5 | — | 1.0 |
| Rh (g/l) | 0.1 | ← | 0.1 | ← | 0.1 | 0.1 | 0.1 |
| HC purification ratio (%) | 89 | 90 | 91 | 90 | 89 | 81 | 82 |
| CO purification ratio (%) | 88 | 90 | 90 | 89 | 91 | 82 | 83 |
| NOx purification ratio (%) | 87 | 88 | 88 | 89 | 89 | 81 | 82 |
| carrier layer omission rate (%) | 1 | 0 | 1 | 1 | 2 | 12 | 17 |
| particle diameter (nm) | 11 | 12 | 11 | 11 | 13 | 140 | 120 |

OPERATION EXAMPLE 11, COMPARATIVE EXAMPLE 11

Active alumina powder obtained by atomizing the grained support used in Operation Example 10, zirconium oxide powder, lanthanum carbonate powder and water were mixed to make slurry according to the blending ratio as shown in Table 12. Then, the same honeycomb supports of Operation Example 9 were immersed in the obtained slurry. After drying and burning, a catalyst carrier layer, containing zirconium oxide, lanthanum oxide and composite oxide and/or solid solution of zirconium oxide and lanthanum oxide, was formed on each honeycomb support. After moistening each honeycomb support with two kinds of a cerium nitrate aqueous solution with different concentration, they were burned in the same manner as Operation Example 9 and catalyst ingredients were carried thereon.

Thus, each ternary catalyst of operation examples 11a to 11b as shown in Table 12 was obtained. In Comparative Example 11, only active alumina was used for making slurry.

Each obtained ternary catalyst was applied to the same catalyst carrier layer peeling off test as Operation Example 9 and the results were shown in Table 12.

OPERATION EXAMPLE 12, COMPARATIVE EXAMPLE 12

Each ternary catalyst of operation examples 12a to 12b and comparative examples 12a to 12b was obtained in the same manner as Operation Example 11 and Comparative Example 11 except for using cerium carbonate powder instead of zirconium oxide powder, zirconium oxychloride instead of cerium nitrate and a ferrite type metal as a material of the honeycomb support.

Each obtained ternary catalyst was applied to the same catalyst carrier layer peeling off test as Operation Example 9 and the results were shown in Table 12.

TABLE 12

| | Operation Example 11 | | Comparative Example 11 | Operation Example 12 | | Comparative Example 12 | |
|---|---|---|---|---|---|---|---|
| | 11a | 11b | | 12a | 12b | 12a | 12b |
| Ce (mol/l) | 0.3 | 0.1 | 0.3 | 0.2 | 0.2 | 0.2 | 0.2 |
| Zr (mol/l) | 0.1 | 0.1 | — | 0.3 | 0.2 | — | — |
| La (mol/l) | 0.1 | 0.1 | — | 0.2 | 0.2 | — | 0.2 |
| Pt (g/l) | 1.2 | 1.2 | 1.2 | — | — | — | — |
| Pd (g/l) | — | — | — | 1.2 | 1.2 | 1.2 | 1.2 |
| Rh (g/l) | 0.12 | 0.12 | 0.12 | 0.12 | 0.12 | 0.12 | 0.12 |
| HC purification ratio (%) | 91 | 92 | 87 | 88 | 88 | 83 | 84 |

TABLE 12-continued

|  | Operation Example 11 | | Comparative Example 11 | Operation Example 12 | | Comparative Example 12 | |
| --- | --- | --- | --- | --- | --- | --- | --- |
|  | 11a | 11b |  | 12a | 12b | 12a | 12b |
| CO purification ratio (%) | 93 | 91 | 86 | 89 | 87 | 82 | 84 |
| NOx purification ratio (%) | 90 | 91 | 83 | 86 | 85 | 83 | 82 |
| carrier layer omission rate (%) | 1 | 0 | 14 | 1 | 2 | 12 | 18 |

As can be seen from the Tables (Tables 10 to 12), all operation examples are superior to comparative examples in respect of the purification ratio. That is because at least a part of cerium oxide, zirconium oxide and lanthanum oxide is present in the form of composite oxide and/or solid solution.

In the ternary catalysts of the operation examples, the growth of cerium oxide particles hardly appears, and a particle diameter shows quite small value of 11 to 13 nm compared to 120 to 150 nm of the comparative examples.

Accordingly, an excellent oxygen capability is ensured and the purification ratio is improved. Also, as can be seen from the results of the catalyst carrier layer peeling off test, the ternary catalysts of the operation examples have an excellent durability at elevated temperatures.

What is claimed is:

1. A catalyst for the purification of exhaust gases, comprising a support substrate, a catalyst carrier layer carried on said support substrate and catalyst ingredients carried thereon,
   wherein said catalyst carrier layer comprises oxides of cerium and zirconium and a member selected from the group consisting of active alumina, zirconia and titanium oxide,
   at least a part of each said oxide of cerium and zirconium is present in the form of a composite oxide and/or solid solution, and
   said composite oxide and/or solid solution is formed by adding a cerium salt and a zirconium salt in the form of an aqueous solution on said member and burning at a temperature not less than 600° C.

2. A catalyst for the purification of exhaust gases as claimed in claim 1,
   wherein at least 5% by weight of each said oxide is present in the form of composite oxide and/or solid solution.

3. A catalyst for the purification of exhaust gases as claimed in claim 1,
   wherein the ratio of atoms between said zirconium and said cerium present in the form of said composite oxide and/or solid solution is 5:95 to 80:20.

4. A catalyst for the purification of exhaust gases as claimed in claim 1,
   wherein said catalyst ingredients are one selected from the group consisting of platinum (Pt), rhodium (Rh), palladium (Pd), iridium (Ir), ruthenium (Ru), osmium (Os), chromium (Cr), nickel (Ni), vanadium (V), copper (Cu), cobalt (Co) and manganese (Mn).

5. A catalyst for the purification of exhaust gases as claimed in claim 1, wherein said member is active alumina and said burning is conducted at a temperature not less than 800° C.

6. A catalyst for the purification of exhaust gases as claimed in claim 1,
   wherein said addition of said cerium and said zirconium to said member is made by contacting said member with an aqueous solution of said cerium salt and an aqueous solution of said zirconium salt separately.

7. A catalyst for the purification of exhaust gases as claimed in claim 1,
   wherein said addition of said cerium and said zirconium to said member is by contacting said member with a mixed aqueous solution of said cerium salt and said zirconium salt.

8. A catalyst for the purification of exhaust gases as claimed in claim 1,
   wherein said addition of said cerium and said zirconium to said member, is made before said member is formed on said support substrate.

9. A catalyst for the purification of exhaust gases as claimed in claim 1,
   wherein said addition of said cerium and said zirconium to said member is made after said member is formed on said support substrate.

10. A catalyst for the purification of exhaust gases, comprising a support substrate, a catalyst carrier layer carried on said support substrate, and catalyst ingredients carried thereon,
    wherein said catalyst carrier layer comprises oxides of cerium, zirconium, and lanthanum, and a member selected from the group consisting of active alumina, zirconia and titanium oxide,
    at least a part of each said oxide of cerium, zirconium and lanthanum is present in the form of a composite oxide and/or solid solution, and
    said composite oxide and/or solid solution is formed by adding a cerium salt, a zirconium salt and a lanthanum salt in the form of an aqueous solution on said member and burning at a temperature not less than 600° C.

11. A catalyst for the purification of exhaust gases as claimed in claim 10,
    wherein at least 5% by weight of each said oxide is present in the form of composite oxide and/or solid solution.

12. A catalyst for the purification of exhaust gases as claimed in claim 10,
    wherein said cerium, said zirconium and said lanthanum present in the form of said composite oxide and/or solid solution are in such ratios that the numbers of atoms of said zirconium and said lanthanum are 5 to 100 and 5 to 150, respectively, based on 100 atoms of said cerium.

13. A catalyst for the purification of exhaust gases as claimed in claim 1,
    wherein said catalyst ingredients are one selected from the group consisting of platinum (Pt), rhodium (Rh), palladium (Pd), iridium (Ir), ruthenium (Ru), osmium (OS), chromium (Cr), nickel (Ni), vanadium (V), copper (Cu), cobalt (Co) and manganese (Mn).

14. A catalyst for the purification of exhaust gases as claimed in claim 10, wherein said member is active alumina and said burning is conducted at a temperature not less than 800° C.

15. A catalyst for the purification of exhaust gases as claimed in claim 10,
    wherein said addition of said cerium, said zirconium and said lanthanum to said member is made by contacting said member with an aqueous solution of said cerium salt, and an aqueous solution of said zirconium salt and an aqueous solution of said lanthanum salt separately.

16. A catalyst for the purification of exhaust gases as claimed in claim 10, wherein said addition is made by contacting a mixed aqueous solution of said cerium salt, said zirconium salt and said lanthanum salt.

17. A catalyst for the purification of exhaust gases as claimed in claim 10, wherein said addition of said cerium, said zirconium and said lanthanum to said member is made before said member is formed on said support substrate.

18. A catalyst for the purification of exhaust gases as claimed in claim 10, wherein said addition of said cerium, said zirconium and said lanthanum to said member is made after said member is formed on said support substrate.

19. A catalyst for the purification of exhaust gases, comprising a catalyst carrier layer and catalyst ingredients carried thereon, wherein said catalyst carrier layer comprises a member selected from the group consisting of active alumina, zirconia and titanium oxide, and oxides of cerium and zirconium, at least a part of each said oxide of cerium and zirconium is present in the form of a composite oxide and/or solid solution, and said composite oxide and/or solid solution is formed by adding a cerium salt and a zirconium salt in the form of an aqueous solution on said member and burning at a temperature not less than 600° C.

20. A catalyst for the purification of exhaust gases as claimed in claim 19, wherein said catalyst carrier layer further comprises an oxide of lanthanum, at least a part of each said oxide of cerium, zirconium and lanthanum is present in the form of a composite oxide and/or solid solution, and said composite oxide and/or solid solution is formed by further adding a lanthanum salt in the form of an aqueous solution on said member.

* * * * *

UNITED STATES PATENT AND TRADEMARK OFFICE
CERTIFICATE OF CORRECTION

PATENT NO. : 4,927,799

DATED : May 22, 1990

INVENTOR(S) : Shinichi Matsumoto, Naoto Miyoshi, Mareo Kimura, Masakuni Ozawa, Akio Isogai It is certified that error appears in the above-identified patent and that said Letters Patent is hereby corrected as shown below:

Title page:

Item , [30], Foreign Application Priority Data
Please correct "Apr. 11, 1986[JP]
                Apr. 11, 1986[JP]"

to         --Nov. 4, 1986[JP]
Column 3:     --Nov. 4, 1986[JP]

Column 16:
Claim 7, line 11, insert --made--, after "is".

Claim 13, line 54, change "claim 1" to --claim 10--;

and
       line 58, chenge "(OS)" to --(Os)--.

Signed and Sealed this

Twenty-first Day of July, 1992

Attest:

DOUGLAS B. COMER

*Attesting Officer*     *Acting Commissioner of Patents and Trademarks*